Dec. 15, 1931.                H. T. SEELEY                1,836,820
                        SPEED INDICATING ARRANGEMENT
                           Filed Oct. 13, 1928
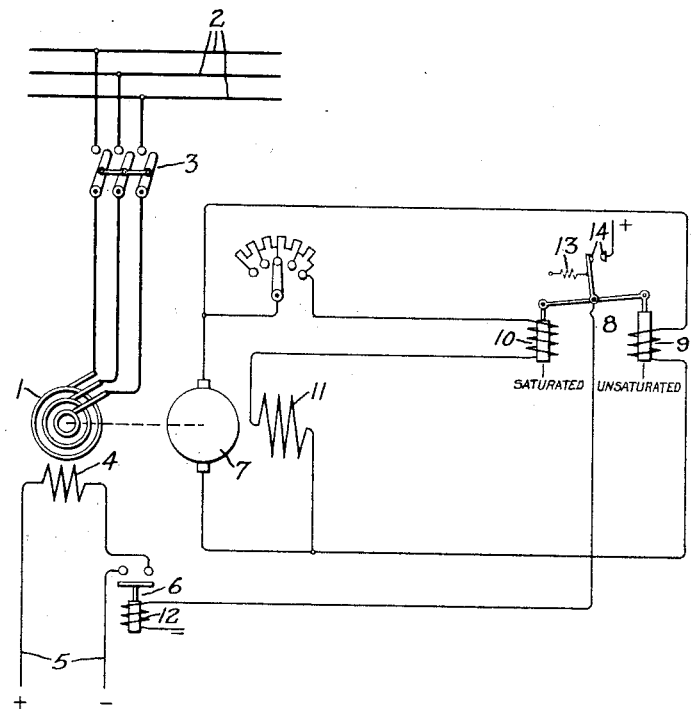
Inventor:
Harold T. Seeley,
by Charles E. Tullar
   His Attorney.

Patented Dec. 15, 1931

1,836,820

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

SPEED INDICATING ARRANGEMENT

Application filed October 13, 1928. Serial No. 312,378.

My invention relates to speed indicating arrangements and particularly to an arrangement for indicating that a device has reached a predetermined speed and its object is to provide an improved arrangement of accomplishing this result.

My invention will be better understood from the following description, when taken in connection with the accompanying drawing which diagrammatically shows an arrangement embodying my invention, and its scope will be pointed out in the appended claims.

Heretofore, the voltage of a shunt generator driven at a speed proportional to the speed of the device whose speed it is desired to indicate, has been employed as an indication of the speed. There is, however, a considerable variation in the rate of build up, and in the ultimate voltage of such a generator. These variations are due in part to the temperature and the field rheostat setting of the machine. I find, however, that a satisfactory indication of the speed may be obtained by means of a differential relay having two opposing electromagnets which are respectively connected so as to be energized by the voltage and the shunt field current of the generator and constructed so that it responds to the ratio of $E/Iu$ where E is the no load voltage of the generator, I is the shunt field current and $u$ is the permeability of the complete magnetic circuit of the machine.

In the accompanying drawing I have shown an arrangement embodying my invention for effecting the closing of the field circuit of a synchronous motor when it reaches a given speed.

Referring to the drawing, 1 represents a synchronous motor which is arranged to be connected to a suitable supply circuit 2 by means of a switch 3. The motor 1 is provided with a field winding 4 which is arranged to be connected to a suitable source of excitation 5 by means of a switch 6 which is arranged to be closed automatically when the speed of the motor 1 reaches a predetermined value when the motor 1 is started.

For effecting the closing of the switch 6 in response to the desired speed of the motor 1, I provide a shunt direct current generator 7 which is driven by the motor 1 in any suitable manner so that the speeds of the motor and generator are proportional, and a differential relay 8 comprising two opposed electromagnets 9 and 10 which are respectively energized in response to the voltage of the generator and the current in the shunt field winding 11 of the generator. The relay 8 is arranged to control the circuit of the closing coil 12 of the field switch 6.

Since the equation $E=IuNC$ gives the no load voltage E of a generator running at N revolutions per minute with a shunt field current I and a magnetic circuit permeability $u$ for the complete magnetic circuit of the machine when C is a constant for a given machine, it will be observed that the ratio $E/Iu$ is a constant for a given machine, and is an indication of the speed N. By constructing the relay 8 so that it is normally biased to its circuit opening position by a suitable biasing means such as a spring 13 the circuit of the closing coil 12 is maintained open when the relay 8 is deenergized. When the motor 1 is started and the speed N thereof increases, E and I increase proportionally and as I increases the permeability $u$ is decreased so that E increases faster than $Iu$. Therefore, by constructing the magnetic circuit of the electromagnet 9 in any suitable manner so that it does not saturate and by constructing the magnetic circuit of the electromagnet 10 so that it does saturate similar to the machine and therefore exerts a torque which is proportional to $Iu$ for all values of shunt field current I, the relay 8 will respond very accurately to the ratio $E/Iu$ which is speed. Therefore, when the motor speed increases above a predetermined value the torque exerted by the electromagnet 9 overcomes the torques exerted by the electromagnet 10 and the spring 13, and the relay 8 closes its contact 14 to complete the circuit of the closing coil 12 and, therefore, effect the energization of the field winding 4 of the motor 1.

While I have in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:

1. An arrangement for determining a predetermined speed of a device comprising a shunt generator arranged to be driven at a speed proportional to the speed of the device and a differential relay responsive to a predetermined relation between the voltage and shunt field current of the generator.

2. An arrangement for determining a predetermined speed of a device comprising a shunt generator arranged to be driven at a speed proportional to the speed of the device and a differential relay having opposed electromagnets respectively energized by the voltage and shunt field current of said generator.

3. An arrangement for determining a predetermined speed of a device comprising a shunt generator arranged to be driven at a speed proportional to the speed of the device and a differential relay having two opposed electromagnets, one of said electromagnets being unsaturated and energized in response to the voltage of said generator and the other of said electromagnets being energized in response to the shunt field current of said generator and having a magnetic circuit designed to saturate gradually so that the torque of said other of said electromagnets is proportional to the product of the permeability and the shunt field current of the generator for all values of the shunt field current.

4. An arrangement for determining a predetermined speed of a device comprising a shunt generator arranged to be driven at a speed proportional to the speed of the device and a differential relay having two opposed electromagnets respectively energized by the voltage of said generator and the shunt field current of said generator and designed so as to exert a resultant torque equal to the ratio between the voltage of the generator and the product of the permeability of the generator and the shunt field current.

In witness whereof, I have hereunto set my hand this 10th day of October, 1928.

HAROLD T. SEELEY.